(12) United States Patent
Seki

(10) Patent No.: US 12,013,038 B2
(45) Date of Patent: Jun. 18, 2024

(54) SEALING DEVICE

(71) Applicant: NOK CORPORATION, Tokyo (JP)

(72) Inventor: Masahiro Seki, Fukushima (JP)

(73) Assignee: NOK CORPORATION (JP)

( * ) Notice: Subject to any disclaimer, the term of this patent is extended or adjusted under 35 U.S.C. 154(b) by 30 days.

(21) Appl. No.: 17/925,684

(22) PCT Filed: Jun. 2, 2021

(86) PCT No.: PCT/JP2021/020973
§ 371 (c)(1),
(2) Date: Nov. 16, 2022

(87) PCT Pub. No.: WO2021/251232
PCT Pub. Date: Dec. 16, 2021

(65) Prior Publication Data
US 2023/0193998 A1  Jun. 22, 2023

(30) Foreign Application Priority Data

Jun. 12, 2020 (JP) .................................. 2020-101994

(51) Int. Cl.
*F16J 15/3276* (2016.01)
*F16C 33/78* (2006.01)

(52) U.S. Cl.
CPC ......... *F16J 15/3276* (2013.01); *F16C 33/782* (2013.01); *F16C 2326/02* (2013.01)

(58) Field of Classification Search
CPC ...... F16J 15/32; F16J 15/3204; F16J 15/3248; F16J 15/3252; F16J 15/3232;
(Continued)

(56) References Cited

U.S. PATENT DOCUMENTS 6,682,076 B1   1/2004 Hosoda et al.
2004/0036226 A1   2/2004 Hosoda et al.

FOREIGN PATENT DOCUMENTS

DE   10309852 A1   10/2003
DE   102011088865 A1   6/2013
(Continued)

OTHER PUBLICATIONS

International Search Report (English and Japanese) issued in PCT/JP2021/020973, dated Jul. 27, 2021; ISA/JP (6 pages).

*Primary Examiner* — Gilbert Y Lee
(74) *Attorney, Agent, or Firm* — Harness, Dickey & Pierce, P.L.C.

(57) ABSTRACT

A sealing device has a first sealing member and a second sealing member. The first sealing member has a cylindrical part mounted on an outer member, and a lip. The second sealing member has a sleeve into which an inner member is fitted, and a flange extending radially outward. The flange has a rigid flange portion connected to the sleeve, and a circular annular elastic flange portion that adheres to the rigid flange portion. An annular protrusion is formed on an inner periphery of the elastic flange portion, and is in contact with an outer peripheral surface of the inner member. In an initial state, the inner peripheral surface of the protrusion has a cylindrical portion having an inner diameter that is less than that of the sleeve. The cylindrical portion has a length of at least 0.15 mm in the initial state.

7 Claims, 3 Drawing Sheets

(58) Field of Classification Search
CPC .. F16J 15/3256; F16J 15/3276; F16C 33/782; F16C 2326/02
See application file for complete search history.

(56) References Cited

FOREIGN PATENT DOCUMENTS

| | | | |
|---|---|---|---|
| DE | 102012204620 A1 | 9/2013 | |
| EP | 3267078 A1 * | 1/2018 | |
| EP | 2962018 B1 * | 5/2019 | ......... B60B 27/0073 |
| JP | H11-304827 A | 11/1999 | |
| JP | 2000-289405 A | 10/2000 | |
| JP | 2002139057 A ‡ | 5/2002 | |
| JP | 2002-333035 A | 11/2002 | |
| JP | 2016-023755 A | 2/2016 | |
| JP | 2017-026124 A | 2/2017 | |
| JP | 2017026124 A ‡ | 2/2017 | |
| JP | 2017-190804 A | 10/2017 | |
| JP | 2020-051601 A | 4/2020 | |
| JP | 2020-144068 A | 9/2020 | |
| WO | 2016-181515 A1 | 11/2016 | |

\* cited by examiner
‡ imported from a related application

SEALING DEVICE

CROSS REFERENCE TO RELATED APPLICATIONS

This application is a U.S. National Phase Application under 35 U.S.C. 371 of International Application No. PCT/JP2021/020973, filed on Jun. 2, 2021, which claims priority to Japanese Patent Application No. 2020-101994, filed on Jun. 12, 2020. The entire disclosures of the above applications are expressly incorporated by reference herein.

BACKGROUND

Technical Field

The present invention relates to sealing devices.

Related Art

A hub of an automotive vehicle is provided with a rolling bearing that supports an axle. The rolling bearing is called a hub bearing. A sealing device is provided between the inner race and the outer race of a hub bearing. The sealing device acts to seal lubricant (grease) inside the bearing and prevents foreign matter, such as water and dust from ingress into the inside of the bearing.

One type of sealing device provided in a hub bearing has a combination of two sealing members (JP-A-2017-190804): a sealing member is mounted on an outer member, e.g., the outer race, and the other sealing member is mounted on an inner member, e.g., the inner race. One of the sealing members has a lip that is brought in slidable contact with the other sealing member, and the lip prevents leakage of lubricant.

The sealing member mounted on the inner member has a sleeve into which the inner member is fitted and a flange extending radially outward from the sleeve. The flange of the sealing member described in JP-A-2017-190804 has a metal flange portion and an elastic flange portion made of an elastic material.

The sleeve of the above sealing member and the inner member fitted into the sleeve are made of rigid materials, and a minute gap may occur between them. In order to ensure sealing the interior space with the sealing device, the inner peripheral portion of the above-mentioned elastic flange portion should be in close contact with the inner member.

When a high load is exerted on the hub bearing, the pressure in the interior space of the bearing increases. Even in this case, it is desirable that no gap be created between the inner peripheral portion of the elastic flange portion and the outer peripheral surface of the inner member, and that sealing of the interior space be maintained.

Accordingly, the present invention provides a sealing device capable of maintaining sealing of the interior space.

SUMMARY

In accordance with an aspect of the present invention, there is provided a sealing device disposed between an inner member and an outer member that rotate relative to each other, the sealing device acting to seal a gap between the inner member and the outer member. The sealing device includes a first sealing member having a cylindrical part adapted to be mounted on the outer member, an annular part extending radially inward from the cylindrical part, and a lip extending from the annular part; and a second sealing member having a cylindrical sleeve adapted such that the inner member is fitted into the sleeve, and a flange extending radially outward from the sleeve and facing the annular part of the first sealing member, the lip of the first sealing member being in slidable contact with the sleeve. The sleeve of the second sealing member is made of a rigid material. The flange of the second sealing member has a rigid flange portion made of the rigid material and connected to the sleeve, and a circular annular elastic flange portion made of an elastic material that adheres to the rigid flange portion. An annular protrusion is formed on an inner periphery of the elastic flange portion, and is adapted to be in contact with an outer peripheral surface of the inner member. The protrusion has an inner peripheral surface, and in an initial state, the inner peripheral surface has a cylindrical portion and two inclined surface portions adjacent to the cylindrical portion, each of the inclined surface portions having a truncated conical shape. The cylindrical portion has an inner diameter that is less than an inner diameter of the sleeve in the initial state. The cylindrical portion of the protrusion has a length of at least 0.15 mm in the initial state.

In this aspect, since the length of the cylindrical portion of the protrusion formed on the inner periphery of the elastic flange portion of the second sealing member is 0.15 mm or more in the initial state, even when the pressure in the interior space sealed by the sealing device is increased, any gap is unlikely to be created between the protrusion of the elastic flange portion and the cylindrical outer peripheral surface of the inner member. Accordingly, sealing of the interior space sealed by the sealing device is maintained.

DETAILED DESCRIPTION

Hereinafter, with reference to the accompanying drawings, an embodiment according to the present invention will be described. It is of note that the drawings are not necessarily to scale, and certain features may be exaggerated or omitted.

Figure 1:
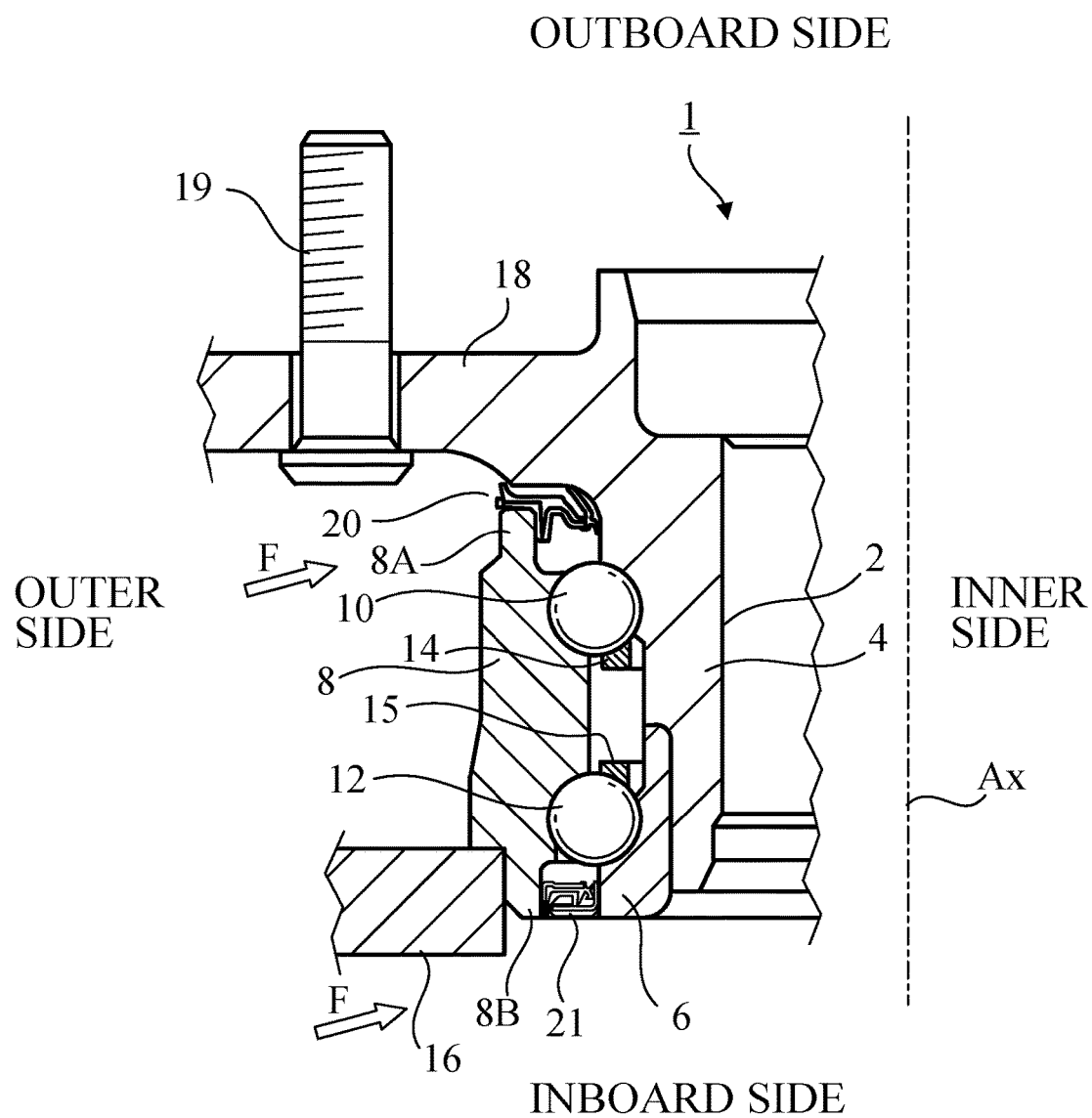
FIG. 1 is a partial cross-sectional view of an example of a rolling bearing in which a sealing device according to an embodiment of the present invention is used.

FIG. 1 shows an automotive vehicle hub bearing, which is an example of a rolling bearing in which a sealing device according to any one of the embodiments of the present invention is used. The present invention is not limited to hub bearings, and is applicable to other types of rolling bearings. In the following description, the hub bearing is a ball bearing. Again, the present invention is not limited to ball bearings, and is applicable to other types of rolling bearings, such as roller bearings and needle bearings, and other types of rolling elements. The present invention is also applicable to rolling bearings used in machines other than automotive vehicles.

The hub bearing 1 includes a hub 4 (inner member) that has a hole 2 into which an axle (not shown) is inserted, an inner race 6 (inner member) attached to the hub 4, an outer race 8 (outer member) located outside of the hub 4 and the inner race 6, multiple balls 10 arranged in a row between the hub 4 and the outer race 8, multiple balls 12 arranged in a row between the inner race 6 and the outer race 8, and multiple retainers 14 and 15 that retain the balls in place.

Whereas the outer race 8 remains stationary, the hub 4 and the inner race 6 rotate with the axle.

In FIG. 1, the central axis Ax common to the axle and hub bearing 1 extends in a vertical direction. In FIG. 1, relative to the central axis Ax only the left part is shown; and although not shown in detail, in FIG. 1 the upper side corresponds to the outer side (outboard side) of the automotive vehicle on which wheels are arranged, while the lower side corresponds to the inner side (inboard side) on which differential gears are arranged. In FIG. 1, the "outer side" and the "inner side" mean the radial outer side and the radial inner side, respectively.

The outer race 8 of the hub bearing 1 is fixed to the hub knuckle 16. The hub 4 has an outboard side flange 18 that extends radially further outward than the outer race 8. A wheel can be attached to the outboard side flange 18 by hub bolts 19.

A sealing device 20 that seals a gap between the outer race 8 and the hub 4 is located close to the end of the outer race 8 on the outboard side. Another sealing device 21 that seals a gap between the outer race 8 and the inner race 6 is located inside the end of the outer race 8 on the inboard side. The sealing devices 20 and 21 prevent outflow of grease, i.e., lubricant from the interior space of the hub bearing 1, and prevent entry of foreign matter (water, including muddy water or salt water) into the interior space of the hub bearing 1 from the outside. In FIG. 1, arrows F indicate an example direction of an exterior flow of foreign matter.

The sealing device 20 is located between the rotatable hub 4 and the cylindrical end portion 8A on the outboard side of the stationary outer race 8 of the hub bearing 1, and seals the gap between the hub 4 and the outer race 8. The sealing device 21 is located between the rotatable inner race 6 and the end portion 8B on the inboard side of the outer race 8 of the hub bearing 1, and seals the gap between the inner race 6 and the outer race 8.

Figure 2:
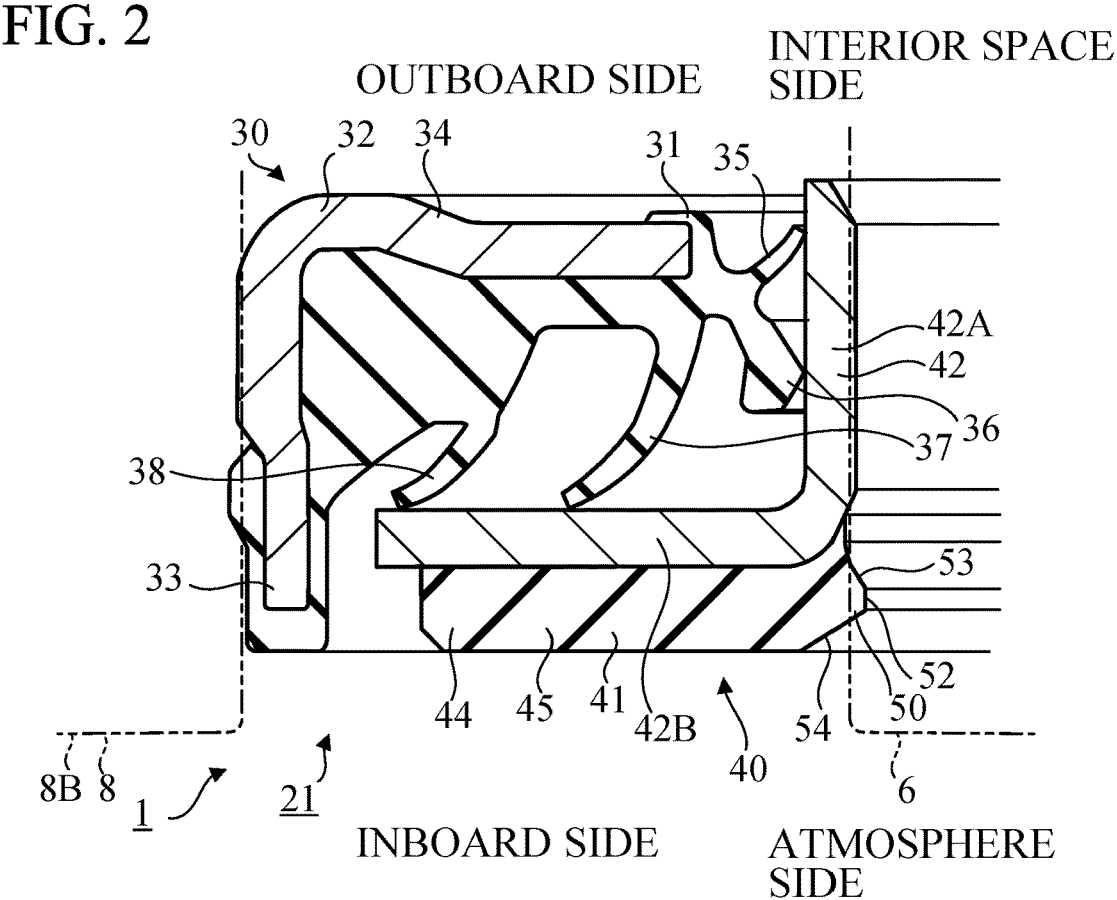
FIG. 2 is a partial cross-sectional view of a sealing device according to an embodiment of the present invention.

As shown in FIG. 2, the sealing device 21 is provided in a gap between the end portion 8B on the inboard side of the outer race 8 of the hub bearing 1 and the inner race 6 of the hub bearing 1. The sealing device 21 is annular in shape, but, in FIG. 2, only the left part of the sealing device 21 is shown. As will be apparent from FIG. 2, the sealing device 21 has a composite structure that includes a first sealing member 30 and a second sealing member 40.

The first sealing member 30 is a stationary sealing member that is adapted to be attached to the outer race 8 and does not rotate. The first sealing member 30 has a composite structure that includes an elastic ring 31 and a rigid ring 32. The elastic ring 31 is made of an elastic material such as an elastomer. The rigid ring 32 is made of a rigid material such as a metal and reinforces the elastic ring 31. As viewed in cross section, the rigid ring 32 is substantially L-shaped. A part of the rigid ring 32 is embedded in the elastic ring 31 and is in close contact with the elastic ring 31.

The first sealing member 30 has a cylindrical part 33, an annular part 34, radial lips 35 and 36, and side lips 37 and 38.

The cylindrical part 33 forms a mounted part that is adapted to be mounted on the outer race 8. More specifically, the cylindrical part 33 is engaged by interference fit, namely, is press-fitted into the end portion 8B of the outer race 8. The annular part 34, which has a circular annular shape, is located radially inside the cylindrical part 33 and extends radially inward toward the inner race 6 from the cylindrical part 33. The annular part 34 has a thinner portion disposed radially inside and a thicker portion disposed radially outside. The cylindrical part 33 and the annular part 34 are formed from the rigid ring 32 and the elastic ring 31.

The radial lips 35 and 36 extend radially inward from the inner end of the annular part 34, and the distal ends pf the radial lips 35 and 36 are brought into contact with the sleeve 42A of the second sealing member 40. The radial lips 35 and 36 are formed from the elastic ring 31.

The side lip 37 extends from the thinner portion of the annular part 34 toward the inboard side. The side lip 38 extends from the thicker portion of annular part 34 toward the inboard side. The distal ends of the side lips 37 and 38 are brought into contact with the rigid flange portion 42B of the second sealing member 40. The side lips 37 and 38 are formed from the elastic ring 31.

The second sealing member 40 may also be referred to as a slinger, that is, a rotational sealing member. The second sealing member 40 is mounted on the inner race 6, rotates together with the inner race 6, and acts to deflect exterior splashing of foreign matter.

In this embodiment, the second sealing member 40 also has a composite structure that includes an elastic ring 41 and a rigid ring 42. The rigid ring 42 is made of a rigid material such as a metal.

As viewed in cross section, the rigid ring 42 is substantially L-shaped. More specifically, the rigid ring 42 includes a cylindrical sleeve 42A, and a circular annular rigid flange portion 42B that extends radially outward from the sleeve 42A. The sleeve 42A forms a mounted part that is adapted to be mounted on the inner race 6. More specifically, an end portion of the inner race 6 is engaged by interference fit, namely, is press-fitted into the sleeve 42A.

The rigid flange portion 42B is disposed radially outside the sleeve 42A, extends radially outwardly, and faces the annular part 34 of the first sealing member 30. In this embodiment, the rigid flange portion 42B is a flat plate and lies on a plane that is perpendicular to the axis of the sleeve 42A.

The elastic ring 41 is in close contact with the rigid flange portion 42B of the rigid ring 42. In this embodiment, the elastic ring 41 is provided to measure the rotational speed of the inner race 6. More specifically, the elastic ring 41 is formed from an elastomer material that contains a magnetic metal powder and a ceramic powder, and has a large number of S poles and N poles provided by the magnetic metal powder. In the elastic ring 41, the S poles and N poles are alternately arranged at equiangular intervals in a circumferential direction. The angle of rotation of the elastic ring 41 can be measured by use of a magnetic sensor (not shown). Therefore, the magnetic sensor and the elastic ring 41 form a magnetic rotary encoder.

The elastic ring 41 and the rigid flange portion 42B are joined to each other and can be regarded as constituting a single flange 44. Thus, the elastic ring 41 can be referred to as an elastic flange portion 45, and the flange 44 can be regarded as having a rigid flange portion 42B made of a rigid material connected to the sleeve 42A and a circular annular elastic flange portion 45 made of an elastic material and being in close contact with the rigid flange portion 42B.

The radial lip 35 of the first sealing member 30 is a grease lip. The grease lip 35 plays a main role in preventing the lubricant from flowing out from the interior space of the hub bearing 1. The radial lip 36 is a dust lip. The dust lip 36 plays a main role in preventing foreign matter from flowing into the interior space of the hub bearing 1 from the outside. Each of the side lips 37 and 38 plays a role in preventing the inflow of foreign matter from the outside toward the radial lip 36.

Whereas the first sealing member 30 is mounted on the stationary outer race 8, the inner race 6 and the second sealing member 40 rotates. Accordingly, the radial lips 35 and 36 slide on the sleeve 42A of the second sealing member 40, and the side lips 37 and 38 slide on the rigid flange portion 42B of the second sealing member 40.

An annular protrusion 50 is formed on the inner periphery of the elastic flange portion 45, and is adapted to be in contact with the outer peripheral surface of the inner race 6. In a case in which the elastic flange portion 45 is not deformed (is in the initial state), the inner peripheral surface of the protrusion 50 has a cylindrical portion 52 and two inclined surface portions 53 and 54 adjacent to the cylindrical portion 52. Each of the inclined surface portions 53 and 54 has a truncated conical shape. In the initial state, the cylindrical portion 52 extends linearly along the axial direction of the second sealing member 40 when viewed from a direction that is perpendicular to the axis of the second sealing member 40. The inclined surface portion 53 is disposed on the interior space side of the cylindrical portion 52, and the inclined surface portion 54 is disposed on the atmospheric side of the cylindrical portion 52 (disposed between the cylindrical portion 52 and the end surface 45a of the elastic flange portion 45).

In FIG. 2, the inner race 6 and outer race 8 are depicted by phantom lines. Since the cylindrical part 33 of the first sealing member 30 is fitted into the outer race 8, the cylindrical part 33 is deformed and is actually positioned more radially inward than the state shown in FIG. 2. In addition, since the inner race 6 is fitted into the sleeve 42A and the elastic flange portion 45 of the second sealing member 40, the sleeve 42A and the elastic flange portion 45 (in particular, the protrusion 50) are deformed and are actually positioned more radially outward than the state shown in FIG. 2.

Figure 3:
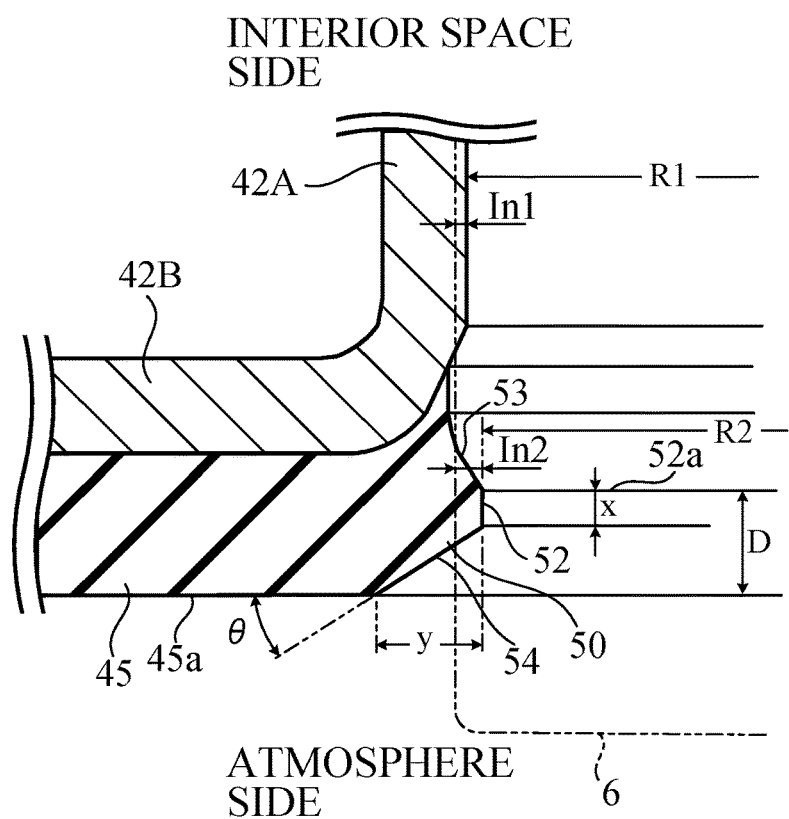
FIG. 3 is an enlarged view of a part of FIG. 2.
Figure 4:
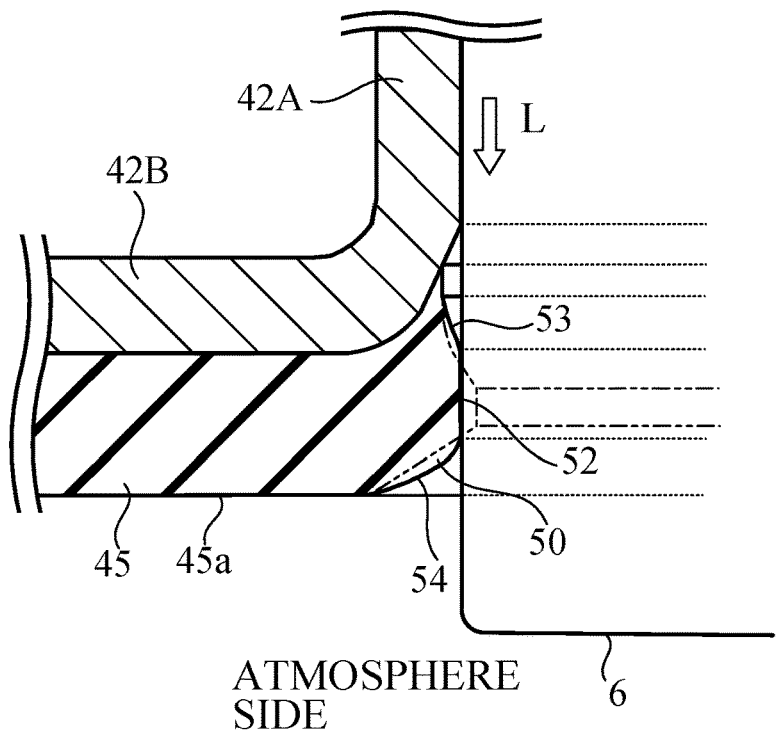
FIG. 4 is an enlarged view similar to FIG. 3, in which an elastic flange portion deformed by an inner member is emphasized.

Thus, FIG. 2 shows the sleeve 42A and elastic flange portion 45 in the initial state, in which they are not deformed. FIG. 3 shows an enlarged view of the sleeve 42A and elastic flange portion 45 in the initial state. FIG. 4 is an enlarged view similar to FIG. 3, but shows the elastic flange portion 45 (in particular, the protrusion 50) deformed by contact with the inner race 6 in solid lines, and the protrusion 50 in the initial state in phantom lines.

Since the sleeve 42A and the inner race 6, which is fitted into the sleeve 42A, are made of rigid materials, a minute gap may occur between them. To ensure sealing the interior space sealed by the sealing device 21, it is preferable that the inner periphery portion of the elastic flange portion 45 be in close contact with the inner race 6.

When a high load is exerted on the hub bearing 1, the pressure in the interior space of the hub bearing 1 increases. In this case, it is undesirable that leakage L of air or the lubricant (see FIG. 4) from the interior space pass a gap between the inner peripheral portion of the elastic flange portion 45 and the outer peripheral surface of the inner race 6 by the high pressure in the interior space. On the other hand, when the temperature of the hub bearing 1 drops (for example, when the automotive vehicle stops running), the pressure in the interior space of the hub bearing 1 reduces. After the leakage L of the air or lubricant from the interior space occur, when the temperature of the hub bearing 1 drops, the pressure in the interior space may become extremely low, so that sealing of the grease lip 35 may be deteriorated, and/or the dust lip 36 may strongly be brought into contact with sleeve 42A and may apply a large torque to the inner race 6. Therefore, even when a high load is exerted on the hub bearing 1, it is desirable that no gap be created between the inner peripheral portion of the elastic flange portion 45 and the outer peripheral surface of the inner race 6, and that sealing of the interior space be maintained.

To ensure sealing of the interior space, the inner diameter of the cylindrical portion 52 of the protrusion 50 in the initial state is less than the inner diameter of the sleeve 42A. Preferably, the difference between the inner radius R1 of the sleeve 42A and the inner radius R2 of the cylindrical portion 52 of the protrusion 50 in the initial state (see FIG. 3) is, for example, 0.1 mm. Therefore, the interference In2 between the cylindrical portion 52 of the protrusion 50 and the inner race 6 can be set 0.1 mm larger than the interference In1 between the sleeve 42A and the inner race 6.

In the initial state, it is preferable that the length x of the cylindrical portion 52 of the inner peripheral surface of the protrusion 50 be 0.15 mm or more. In this case, even when the pressure in the interior space sealed by the sealing device 21 is increased, any gap is unlikely to be created between the protrusion 50 of the elastic flange portion 45 and the cylindrical outer peripheral surface of the inner race 6. Accordingly, sealing of the interior space sealed by the sealing device 21 is maintained.

It is preferable that the length x of the cylindrical portion 52 in the initial state be equal to or less than a half of the distance D between the end surface 45a (the surface exposed to the atmosphere) of the elastic flange portion 45 and the end 52a of the cylindrical portion 52 on the side of the sleeve 42A. In this case, the contact pressure of the protrusion 50 against the outer peripheral surface of the inner race 6 can be made high. Accordingly, even if the pressure in the interior space sealed by the sealing device 21 is increased, a part of the protrusion 50 does not protrude to the atmosphere side more than the end surface 45a of the elastic flange portion 45, and any gap will not occur between the protrusion 50 and the outer peripheral surface of the inner race 6 since such a large deformation of the protrusion 50 is prevented.

Figure 5:
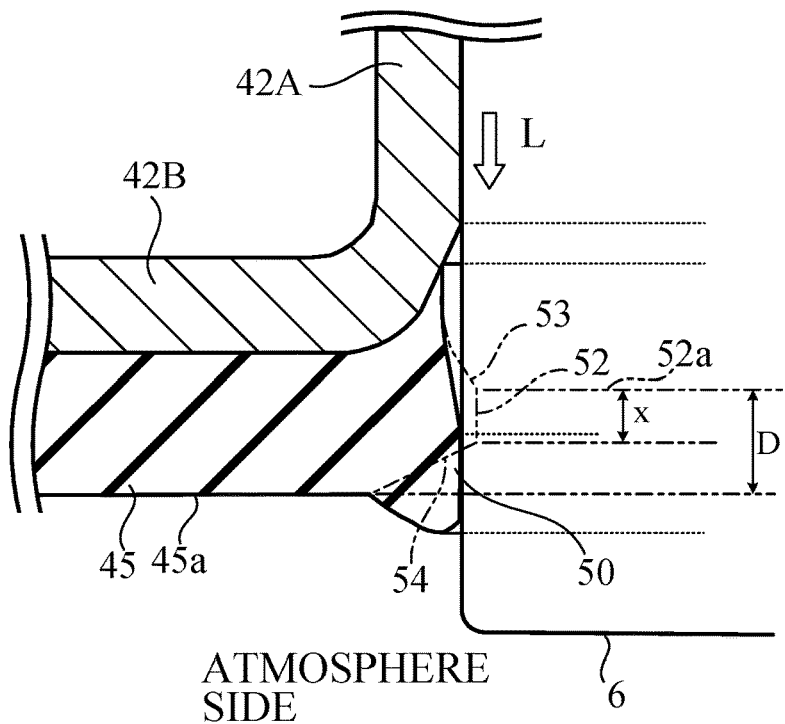
FIG. 5 is an enlarged cross-sectional view of a part of a sealing device according to a comparative example.

FIG. 5 is an enlarged cross-sectional view of a part of a sealing device according to a comparative example. In FIG. 5, in a similar manner shown in FIG. 4, the elastic flange portion 45 (in particular, the protrusion 50) deformed by contact with the inner race 6 is shown in solid lines, and the protrusion 50 in the initial state is shown in phantom lines. In the comparative example in FIG. 5, the length x of the cylindrical portion 52 in the initial state is greater than a half of the distance D between the end surface 45a of the elastic flange portion 45 and the end 52a of the cylindrical portion 52. In this case, the contact pressure of the protrusions 50 against the outer peripheral surface of the inner race 6 is low. Accordingly, when the pressure in the interior space sealed by the sealing device 21 is increased, a part of the protrusion 50 may protrude to the atmosphere side farther than the end surface 45a of the elastic flange portion 45. If the protrusion 50 is greatly deformed in this way, a gap may be created between the protrusion 50 and the outer peripheral surface of the inner race 6, and the leakage L of the air or lubricant may pass the gap between the protrusion 50 and the outer peripheral surface of the inner race 6.

In the embodiment, the distance D is 0.65 mm. The distance y in radial directions of the second sealing member 40 between the intersection of the end surface 45a of the elastic flange portion 45 and the inclined surface portion 54 and the cylindrical portion 52 is 0.7 mm. In this case, in the initial state, it is preferable that the angle θ of the truncated conical inclined surface portion 54 relative to the end surface 45a be not less than 27 degrees and not more than 35 degrees.

If θ is 27 degrees, the length x of the cylindrical portion 52 in the initial state is 0.3 mm, which is less than a half of the distance D. Therefore, a part of the protrusion 50 does not protrude beyond the end surface 45a of the elastic flange portion 45 toward the atmosphere side.

If θ is 35 degrees, the length x of the cylindrical portion 52 in the initial state is 0.16 mm, which is greater than 0.15 mm. Therefore, even if the pressure in the interior space sealed by the sealing device 21 is increased, a gap is unlikely to be created between the protrusion 50 of the elastic flange portion 45 and the cylindrical outer peripheral surface of the inner race 6.

The present invention has been shown and described with reference to preferred embodiments thereof. However, it will be understood by those skilled in the art that various changes in form and detail may be made without departing from the scope of the invention as defined by the claims. Such variations, alterations, and modifications are intended to be encompassed in the scope of the present invention.

For example, in the above-described embodiment, the hub 4 and the inner race 6, which are inner members, are rotatable members, while the outer race 8, which is an outer member, is a stationary member. However, the present invention is not limited thereto, and may be configured such that multiple sealed members rotate relative to each other. For example, inner members may be stationary while an outer member may be rotatable, or all of the members may be rotatable.

The use of the present invention is not limited to sealing the hub bearing 1. For example, the sealing device or the sealing structure according to the present invention may be applied to a differential gear mechanism or other power transmission mechanism of an automotive vehicle, to a bearing or other support mechanism for a drive shaft of an automotive vehicle, or to a bearing or other support mechanism of a rotary shaft of a pump.

In the above embodiment, the distal ends of the side lips 37 and 38 of the first sealing member 30 are brought into contact with the rigid flange portion 42B of the second sealing member 40. However, the side lips 37 and 38 need not be in contact with the rigid flange portion 42B. The number of side lips is not limited to that in the embodiment. Instead of or in addition to the side lips, protrusions that facilitate discharge of foreign matter may be provided in the first sealing member 30 or the second sealing member 40.

The invention claimed is:

1. A sealing device disposed between an inner member and an outer member that rotate relative to each other, the sealing device acting to seal a gap between the inner member and the outer member, the sealing device comprising:
    a first sealing member having a cylindrical part adapted to be mounted on the outer member, an annular part extending radially inward from the cylindrical part, and a lip extending from the annular part; and
    a second sealing member having a cylindrical sleeve adapted such that the inner member is fitted into the sleeve, and a flange extending radially outward from the sleeve and facing the annular part of the first sealing member, the lip of the first sealing member being in slidable contact with the sleeve,
    the sleeve of the second sealing member being made of a rigid material
    the flange of the second sealing member having a rigid flange portion made of the rigid material and connected to the sleeve, and a circular annular elastic flange portion made of an elastic material that adheres to the rigid flange portion,
    an annular protrusion is formed on an inner periphery of the elastic flange portion, the annular protrusion adapted to be in contact with a cylindrical outer peripheral surface of the inner member,
    the protrusion having an inner peripheral surface, in an initial state in which the elastic flange portion is not in contact with the outer peripheral surface of the inner member and is not deformed, the inner peripheral surface having a cylindrical portion and two inclined surface portions adjacent to the cylindrical portion, each of the inclined surface portions having a truncated conical shape,
    in a state in which the elastic flange portion is in contact with the outer peripheral surface of the inner member and is deformed, the cylindrical portion and the two inclined surface portions are adapted to be in contact with the outer peripheral surface of the inner member and are adapted to be deformed,
    the cylindrical portion having an inner diameter that is less than an inner diameter of the sleeve in the initial state,
    the cylindrical portion of the protrusion having a length along an axial direction of the sealing device in the initial state, the length being at least 0.15 mm.

2. The sealing device according to claim 1, wherein the length of the cylindrical portion of the protrusion along the axial direction of the sealing device in the initial state is equal to or less than a half of a distance between an end surface of the elastic flange portion on a side opposite to the rigid flange portion in the axial direction of the sealing device and an end of the cylindrical portion on a side of the sleeve in the axial direction of the sealing device.

3. The sealing device according to claim 2, wherein in the initial state, an angle of the truncated cone-shaped inclined surface portion between the cylindrical portion of the protrusion and the end surface of the elastic flange portion relative to the end surface of the elastic flange portion is equal to or less than 35 degrees.

4. The sealing device according to claim 3, wherein in the initial state, the angle is equal to or greater than 27 degrees.

5. The sealing device according to claim 2, wherein in the initial state, an angle of the truncated cone-shaped inclined surface portion between the cylindrical portion of the protrusion and the end surface of the elastic flange portion relative to the end surface of the elastic flange portion is equal to or greater than 27 degrees.

6. The sealing device according to claim 1, wherein in the initial state, an angle of the truncated cone-shaped inclined surface portion between the cylindrical portion of the protrusion and an end surface of the elastic flange portion on a side opposite to the rigid flange portion relative to the end surface of the elastic flange portion is equal to or less than 35 degrees.

7. The sealing device according to claim 1, wherein in the initial state, an angle of the truncated cone-shaped inclined surface portion between the cylindrical portion of the protrusion and an end surface of the elastic flange portion on a side opposite to the rigid flange portion relative to the end surface of the elastic flange portion is equal to or greater than 27 degrees.

* * * * *